May 11, 1965  E. W. TIPTON  3,183,461
MAGNETIC CORE STRUCTURE WITH COOLING PASSAGES THEREIN
Filed Feb. 5, 1962  3 Sheets-Sheet 1

INVENTOR
Earl W. Tipton
BY
ATTORNEY

May 11, 1965   E. W. TIPTON   3,183,461
MAGNETIC CORE STRUCTURE WITH COOLING PASSAGES THEREIN
Filed Feb. 5, 1962   3 Sheets-Sheet 2

May 11, 1965 E. W. TIPTON 3,183,461
MAGNETIC CORE STRUCTURE WITH COOLING PASSAGES THEREIN
Filed Feb. 5, 1962 3 Sheets-Sheet 3

United States Patent Office 3,183,461
Patented May 11, 1965

3,183,461
MAGNETIC CORE STRUCTURE WITH COOLING PASSAGES THEREIN
Earl W. Tipton, Hickory Township, Mercer County, Pa., assignor to Westinghouse Electric Corporation, East Pittsburgh, Pa., a corporation of Pennsylvania
Filed Feb. 5, 1962, Ser. No. 170,970
5 Claims. (Cl. 336—60)

My invention relates to laminated magnetic core structures for use in electrical inductive apparatus, such as transformers.

In electrical inductive appparatus, such as core form transformers using cruciform cores, it is often necessary to limit the temperature rise of the core by some form of ventilation. Ventilating the core by means of spacers between the laminations to form ducts has had only limited effectiveness because the thermally insulating coatings of the laminations hinder heat conduction from one lamination to another.

It is an object of my invention to provide an improved laminated magnetic core structure for use in inductive apparatus.

It is another object of my invention to provide an improved laminated magnetic core by providing ducts transverse to the plane of the laminations of the core to utilize the higher heat conductivity of the laminated core in directions parallel to the plane of the laminations.

The heat is conducted best in directions parallel to the plane of the laminations because in this direction the heat is flowing through metal only and not through the thermally insulating coatings on the laminations, which coatings are of poor thermal conductivity.

My invention accomplishes these objects by constructing the two outer leg portions or members of a three leg laminated magnetic core of two stacks of magnetic laminations of dissimilar length with a gap between the stacks of laminations. The center leg portion or member of the core is constructed of two spaced apart stacks of laminations identical to the shorter of the lamination stacks used in the two outer legs. The leg members are joined at oblique angles to yoke members such as those yoke members disclosed in U.S. Patent No. 2,300,964, Putnam, assigned to the same assignee as the present application.

The benefits derived from this invention include better ventilation for the electrical coils which are wound around the legs of the laminated core, as well as a flux pattern in the legs of the core which is improved due to less crowding of the flux to the center of the laminations at the joints.

The teachings of this invention produce a laminated magnetic core that has a good flux pattern, uses no insert between the center leg and the yoke members, is rigid and uses a minimum number of lamination shapes.

For a better understanding of the invention reference may be had to the accompanying drawings, in which.

Figures 1, 2:
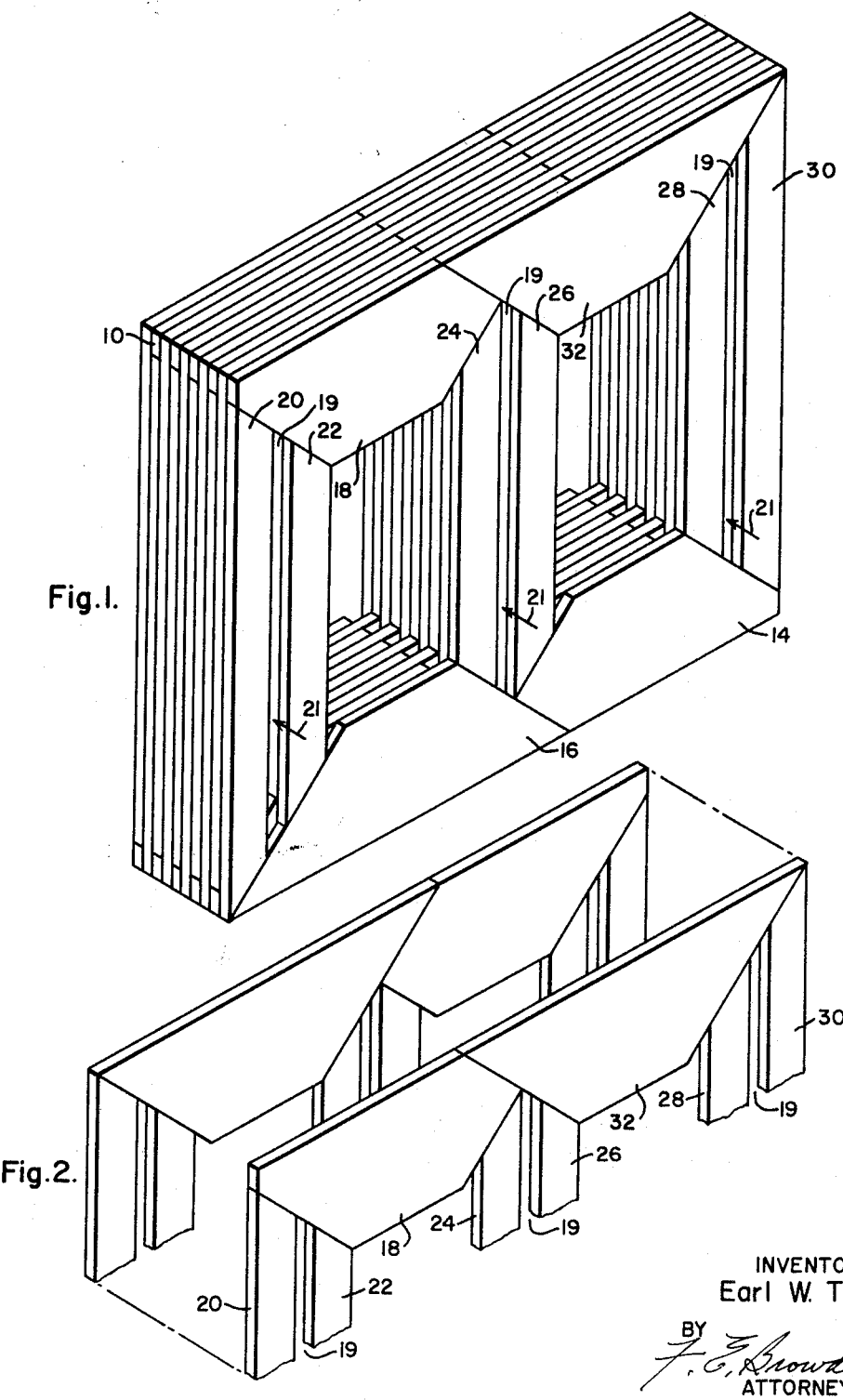
FIGURE 1 is a perspective view of an embodiment of the invention, in a three phase laminated magnetic core using cooling ducts which are transverse to the plane of the laminations.
FIG. 2 shows a fragmentary exploded view of two layers of the core of FIG. 1, showing how an overlap of substantially constant width is obtained at all leg and yoke joints between adjacent laminations.

Referring to FIGS. 1 and 2 there is illustrated an embodiment of the invention for a three phase core. A leg member stack 20 comprising one set of laminations is joined at one end to a yoke member 18 and at the other end to a yoke member 16. A shorter leg member stack 22 comprising another set of laminations is spaced from the leg member stack 20 to provide an oil duct or ventilating duct 19 between the sets of laminations comprising the leg member stacks 20 and 22. The leg member stack 22 is joined to the yoke members 16 and 18 in the manner in which the leg member stack 20 is joined to the yoke members 16 and 18.

The central leg of the core is formed by joining leg member stack 24 comprising one set of laminations at one end to a yoke member 18 and at the other end to a yoke member 16. A leg member stack 26 comprising another set of laminations is spaced from the leg member stack 24 to provide an oil duct or ventilating duct 19 between the sets of laminations comprising the leg member stacks 24 and 26. The leg member stack 26 is joined to the yoke members 32 and 14 in the manner in which the leg member stack 24 is joined to the yoke members 18 and 16. It will be noted that the lamination stacks of the central leg are identical to the shorter lamination stacks 22 and 28 of the outside legs.

The third leg of the core is formed by leg member stack 28 comprising one set of laminations joined at one end to a yoke member 32 and at the other end to a yoke member 14. A leg member stack 30 comprising another set of laminations is spaced from the leg member stack 28 to provide an oil duct or ventilating duct 19 between the set of laminations comprising leg member stacks 28 and 30. The leg member stack 30 is joined to the yoke members 32 and 14 in the manner in which the leg member stack 28 is joined to the yoke members 32 and 14.

The leg portions 20, 22; 24, 26, and 28, 30 of the core and the yoke portions 18, 32; and 16, 14 of the core are connected at oblique angles in the manner as described for solid legs in U.S. Patent No. 2,300,964, Putnam, assigned to the same assignee as the present application. This is achieved by making the yoke laminations 18, 32, 14 and 16 of the core wider than the total width of the legs of the core by an amount 10. This enables butt and lap joints to be made in adjacent laminations and reduces the magnetic induction in the yokes 18, 32, 14, 16 by providing a greater area for flux passage. My invention eliminates the special shape of lamination used in the center leg of the three phase embodiment of Putnam by using the same lamination shape in the center leg as in the outer legs.

The width of duct 19 is also made equal to the dimension 10, as shown by FIGURE 1, to make it possible to cut the leg laminations of a three phase core center leg 24, 26 identical to the shorter of the outer leg laminations 22 and 28. This eliminates the need for making the center leg of a three phase configuration of an unique shape as has been done in the past as seen by FIGURE 9 of U.S. Patent No. 2,300,964, Putnam. This configuration saves scrap and eliminates an operation in the manufacture of the center leg laminations 24 and 26. It also reduces the lamination inventory required in the shop.

FIG. 2 illustrates two layers of the three phase core of FIG. 1 and shows in detail how the leg portions and the yoke portions are joined and how the different layers of the laminations overlap. With this arrangement all the joint between leg laminations and yoke laminations are accomplished with 45° mitered joints.

In this embodiment of my invention the ventilating ducts 19 permit the cooling fluid to flow transverse to the laminations, as indicated by the arrows 21. Since the heat in each lamination is conducted more readily to the edges of the laminations, rather than through the thermal insulation coatings of the laminations, the ducts 19 permit the cooling fluid to contact both edges of the laminations and rapidly take heat away from the laminations.

Figure 3:
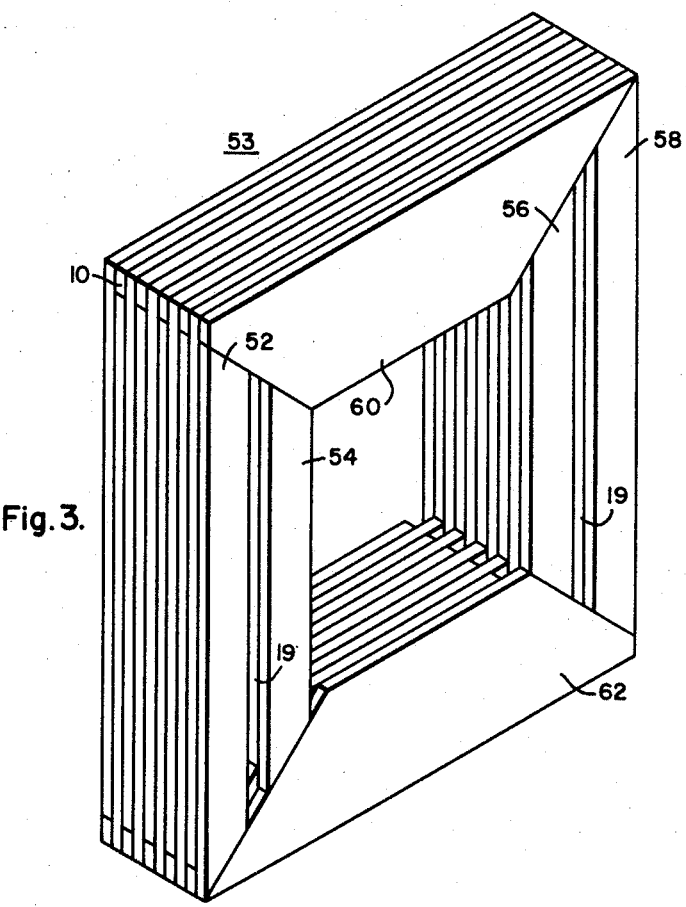
FIG. 3 is a perspective view of an embodiment of the invention in a single phase laminated magnetic core using cooling ducts which are transverse to the plane of the laminations.

An embodiment of my invention for use as a single phase laminated magnetic core is shown in FIG. 3. In this core the leg member 52 comprising one set of laminations is joined at one end to a yoke member 60 and at the other end to a yoke member 62. A leg member 54 comprising another set of laminations is spaced from the leg member 52 to provide an oil duct or ventilating duct 19 between the sets of laminations comprising the leg members 52 and 54. The leg member 54 is joined to the yoke members 60 and 62 in the same manner in which the leg member 52 is joined to the yoke members 60 and 62.

The second leg of the laminated magnetic core 53 is formed by joining leg member 56 comprising one set of laminations at one end to yoke member 60 and at the other end to yoke member 62. The leg member 58 comprising another set of laminations is spaced from the leg member 56 to provide an oil duct or ventilating duct 19 between the sets of laminations comprising the leg members 56 and 58. The leg member 58 is joined to the yoke members 60 and 62 in the same manner in which the leg member 56 is joined to the yoke members 60 and 62.

The leg portions 52, 54; and 56, 58 and the yoke portions 60 and 62 are connected in a manner substantially as described for solid legs in Patent No. 2,300,964, Putnam, assigned to the same assignee as the present application. This is achieved by making the yoke laminations 60 and 62 wider than the combination of two lamination stacks 52 and 54 or 56 and 58 plus the duct between them which make up the legs of the core by an amount 10. This enables butt and lap joints to be alternated in the lamination stack and reduces the magnetic induction in the yokes 60, 62 by providing a greater area in the yoke for flux passage.

Figure 4:
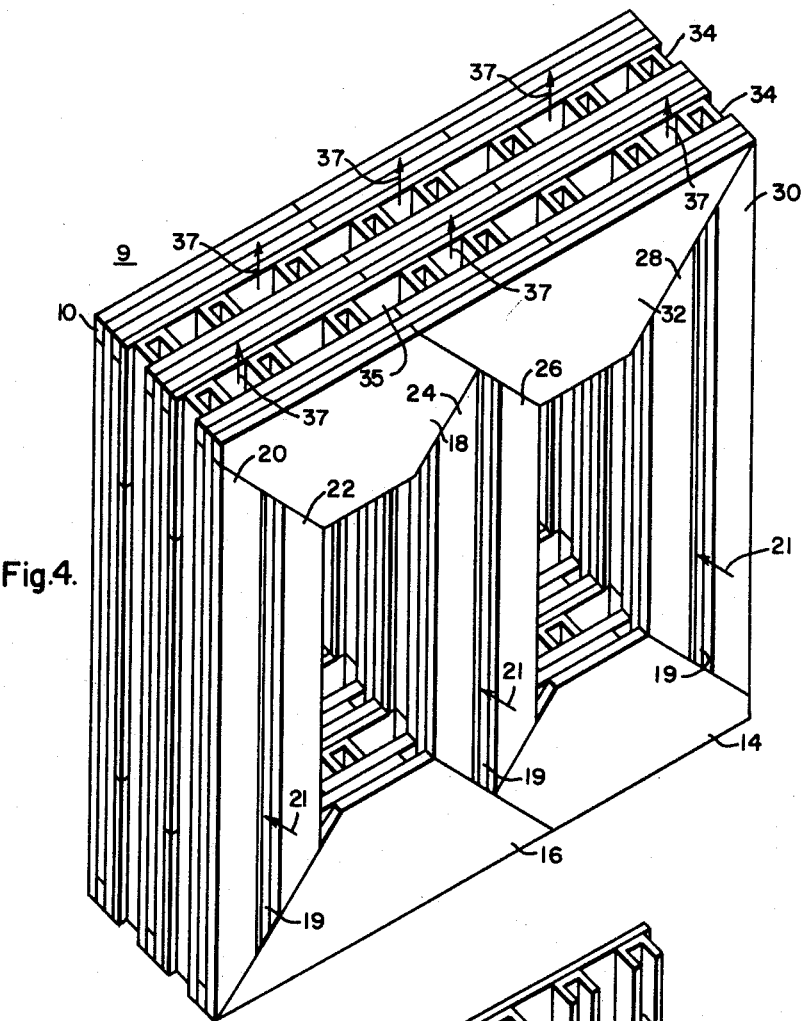
FIG. 4 is a perspective view of an embodiment of the invention in a three phase laminated magnetic core using cooling ducts between the laminations as well as cooling ducts transverse to the laminations.

In FIGURE 4 an arrangement of laminations is illustrated for building up a three phase core 9 having three legs, such as might be used in a three phase transformer. In this core a leg member 20 comprising one set of laminations is joined at one end to a yoke member 16. A leg member 22 comprising another set of laminations is spaced from the leg member 20 to provide on oil duct or ventilating duct 19 between the sets of laminations comprising the leg members 20 and 22. The leg member 22 is joined to the yoke member 16 and 18 in the same manner in which the leg member 20 is joined to the yoke members 16 and 18.

The central leg of the core is formed by joining a leg member 24 comprising one set of laminations at one end to a yoke member 18 and at the other end to a yoke member 16. A leg member 26 comprising another set of laminations is spaced from the leg member 24 to provide an oil duct or ventilating duct 19 between the sets of laminations comprising the leg members 24 and 26. The leg member 26 is joined to the yoke members 32 and 14 in a manner in which the leg member 24 is joined to the yoke members 18 and 16.

The third leg of the core is formed by a leg member 28 comprising one set of laminations joined at one end to a yoke member 32 and at the other end to a yoke member 14. A leg member 30 comprising another set of laminations is spaced from the leg member 28 to provide an oil duct or ventilating duct 19 between the sets of laminations comprising the leg members 28 and 30. The leg member 30 is joined to the yoke members 32 and 14 in a manner in which the leg member 28 is joined to the yoke members 32 and 14.

The leg portions 20, 22; 24, 26; and 28, 30 of the core and the yoke portions 18, 32; and 16, 14 of the core are connected at the joints in the same manner as described for unventilated legs in Patent No. 2,300,964, Putnam, assigned to the same assignee as the present application. This result is achieved by making the yoke laminations 18, 32, 14, and 16 of the core wider than the width of the ventilated legs of the core by an amount 10. This enables butt and lap joints to be made in adjacent laminations and reduces the magnetic induction in the yokes 18, 32, 14, 16 by providing a greater area for flux passage in the yoke portion.

The duct width 19 is also made equal to the dimension 10 as shown by FIGURE 4 to make it possible to cut the laminations of a three phase core center leg 24, 26 identical to the shorter of the outer leg laminations 22 or 28. This eliminates the need for making the center leg of a three phase configuration of unique shape as has been done in the past as shown in FIGURE 9 of U.S. Patent No. 2,300,964, Putnam. This dual use of a single lamination shape saves scrap and eliminates an operation in the manufacture of the center leg laminations 24, 26. It also reduces the lamination inventory required in the shop.

Another novel feature of my invention is the ducts which have been produced by the gaps 19 between the leg lamination segments as between leg lamination segments 20, 22; 24, 26; and 28, 30. FIGURE 4 shows an embodiment of my invention that uses spacers of steel or a non-magnetic material 34, to achieve inter-lamination ducts such as 35, as well as ducts 19 transverse to the plane of the laminations, when the build-up of the laminations is sufficient to warrant cross-ventilation.

The cross ventilation of the core is achieved by permitting the cooling fluid to flow through the legs of the core in a direction 37 substantially parallel to the plane of the laminations as well as in a direction 21 that is essentially normal to the plane of the laminations.

Figure 5:
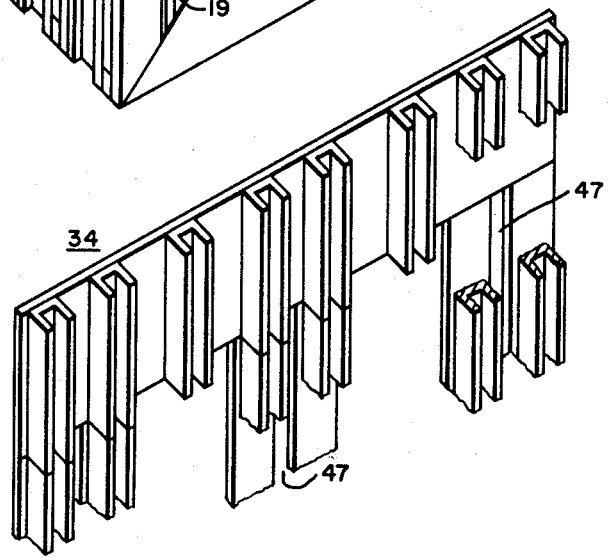
FIG. 5 shows a fragmentary view of one type of duct-forming spacer to be used between laminations.

Referring to FIGS. 4 and 5 there is shown the spacers 34 which form the inter-lamination ducts such as 35. The spacers 34 may be made of electrical steel, carbon steel or a suitable non-magnetic material, so constructed as to have gaps 47 to allow the transverse ducts 19 to be continuous through the core structure 9.

From FIGURES 1, 2, 3, 4 and 6 it will be seen that the transverse ducts 19 have not been extended into the yokes such as yokes 18, 32, 16 and 14 because the yokes 18, 32, 16 and 14 are better ventilated than the legs 20, 22; 24, 26; and 28, 30 and also they are not subject to the heat and insulating effect of the coils 46, 86, and 84. If the transverse ducts 19 were extended into the yokes 18, 32, 16 and 14 the coil would be divided into three separate cores, two located side-by-side within a third. Such a core when used as a three phase magnetic circuit has a distorted flux distribution and higher losses than the core disclosed by this invention.

Figure 6:
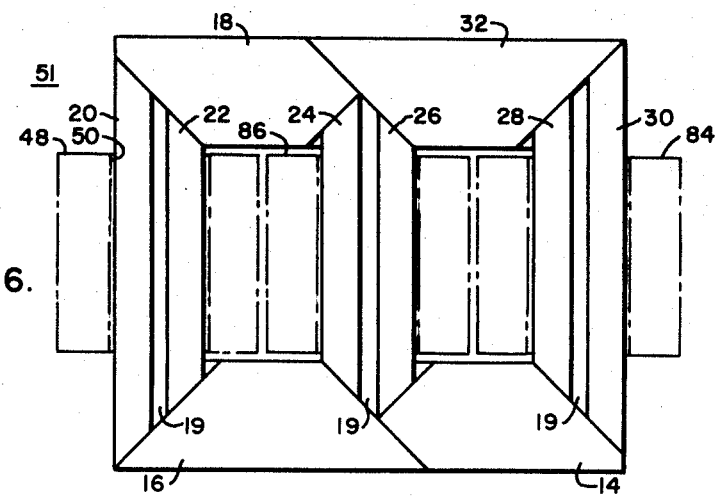
FIG. 6 is an elevation view illustrating how coils may be placed on one embodiment of the invention to be cooled by the transverse ducts.

The laminated ventilated magnetic core of FIGURE 1 is illustrated in FIGURE 6 with coils 48, 86, and 84 added. Experience has shown that a magnetic core and coil assembly 51 as shown in FIG. 6 will be hottest in a region just below the top of the coils 48, 86 and 84, as at region 50 of coil 48 due to the combined heat from the core leg sections 20, 22 and the coil 48, as well as the insulating effect of the coil 48. Thus, it is seen that the ducts 19 transverse to the plane of the laminations are ideally located to cool the hottest part of the core and coil assembly 51.

It can be seen from FIGURES 4 and 6 that I have provided an improved magnetic core that has cooling ducts 19 in the legs 20, 22; 24, 26; and 28, 30 located transverse to the plane of the laminations so as to remove heat more efficiently than without ducts or with inter-lamination ducts 35 alone. The transverse ducts 19 have the advantage of cooling the core and coil without increasing the size of the core and coil assembly 51, as is necessary with inter-lamination ducts 35 alone. My invention provides a good flux path between the legs 20, 22; 24, 26; and 28, 30 and yokes 18, 32, 14, 16 by using essentially 45° butt and lap joints between alternate laminations as described for unventilated cores in the above mentioned U.S. Patent 2,300,964, Putnam. This feature uses laminated magnetic material to its best advantage whether it be ordinary electrical steel, single grain oriented steel or a multiple oriented magnetic material.

It will, therefore, be apparent that there has been disclosed an improved laminated magnetic core which is ventilated more efficiently than has been the practice in the past. Only two lamination shapes are required for the ventilated legs.

Since numerous changes may be made in the above described apparatus and different embodiments of the invention may be made without departing from the spirit and scope thereof, it is intended that all the matter contained in the foregoing description or shown in the accompanying drawing shall be interpreted as illustrative and not in a limiting sense.

I claim as my invention:

1. A laminated magnetic core comprising two yoke portions and at least two leg portions, said leg portions including two stacks of laminations spaced in side by side relation to provide a duct between said stacks, each of the laminations in said yoke and leg portions having first and second ends cut at an oblique angle, each of said leg and yoke portions including a plurality of layers of laminations, with each layer of laminations being positioned with the ends of the leg laminations connected to a yoke lamination to form a substantially rectangular core having joints in each layer which overlap the joints in adjacent layers, the adjacent ends of the laminations in each layer of the two stacks of laminations which form each of said leg portions being connected to the same yoke lamination.

2. A laminated magnetic core comprising two yoke portions and two leg portions, said leg portions including two stacks of laminations spaced in side by side relation to provide a duct between said stacks, each of the laminations in said yoke and leg portions having first and second ends cut at an oblique angle, each of said leg and yoke portions including a plurality of layers of laminations, with each layer of laminations being positioned with the ends of the leg laminations connected to a yoke lamination to form a substantially rectangular core having joints in each layer which overlap the joints in adjacent layers, the adjacent ends of the laminations in each layer of the two stacks of laminations which form each of said leg portions being connected to the same yoke lamination.

3. A laminated three phase magnetic core comprising two yoke portions, two outer leg portions, and one inner leg portion, said two outer leg portions each including first and second stacks of laminations having first and second shapes, respectively, spaced in side by side relation to provide a duct between said stacks, said inner leg portion including two stacks of laminations each having the same shape as one of the stacks of laminations of said outer leg portion and spaced in side by side relation to provide a duct between said stacks, each of the laminations in said yoke and leg portions having first and second ends cut at an oblique angle, each of said leg and yoke portions including a plurality of layers of laminations, with each layer of laminations being positioned with the cut ends of the inner and outer leg laminations connected to a matching cut on a yoke lamination to form a substantially rectangular core having two windows and joints in each layer which overlap the joints in adjacent layers, the adjacent ends of the laminations in each layer of the two stacks of laminations which form each of said outer leg portions being connected to the same yoke lamination, the connections between the two stacks of laminations which form said inner leg portion and said yoke portions providing the complete magnetic path between said yoke portions and inner leg portion.

4. A laminated three phase magnetic core comprising two yoke portions, two outer legs portions, and one inner leg portion, said two outer leg portions each including first and second stacks of laminations having first and second shapes, respectively, spaced in side by side relation to provide a duct between said stacks, said inner leg portion including two stacks of laminations each having the same shape as one of the stacks of laminations of said outer leg portions and spaced in side by side relation to provide a duct between said stacks, each of the laminations in said yoke and leg portions having first and second ends cut at an oblique angle, each of said leg and yoke portions including a plurality of layers of multiple oriented magnetic laminations, with each layer of laminations being positioned with the cut ends of the inner and outer leg laminations connected to a matching cut on a yoke lamination to form a substantially rectangular core having joints in each layer which overlap the joints in adjacent layers, the adjacent ends of the laminations in each layer of the two stacks of laminations which form each of said outer leg portions being connected to the same yoke lamination, the connections between the two stacks of laminations which form said inner leg portion and said yoke portions providing the complete magnetic path between said yoke portions and inner leg portions.

5. A laminated magnetic core comprising two stacked yoke portions and at least two stacked leg portions, said leg portions including two stacks of laminations spaced in side by side relation to provide a duct between said stacks perpendicular to the plane of the stacked laminations of said leg portions, each of the laminations in said yoke and leg portions having first and second ends cut at an oblique angle, each of said leg and yoke portions including a plurality of layers of laminations, with each layer of laminations being positioned with the ends of the leg laminations connected to a yoke lamination to form a substantially rectangular core having joints in each layer which overlap the joints in adjacent layers, the adjacent ends of the laminations in each layer of the two stacks of laminations which form each of said leg portions being connected to the same yoke lamination, and duct forming spacers disposed between certain of the stacked laminations which form said yoke and leg portions to form ducts parallel with the plane of the stacked laminations of said leg and yoke portions.

References Cited by the Examiner

UNITED STATES PATENTS

| | | | |
|---|---|---|---|
| 2,300,964 | 11/42 | Putman | 336—217 |
| 2,547,065 | 4/51 | Wadhams | 336—61 |
| 2,792,554 | 5/57 | Graham | 336—216 X |
| 2,812,505 | 11/57 | Somerville | 336—5 |
| 2,912,660 | 11/59 | Graham | 336—218 X |
| 2,922,972 | 1/60 | Gordy | 336—217 X |
| 2,985,855 | 5/61 | Stone | 336—219 X |

JOHN F. BURNS, *Primary Examiner.*